(12) United States Patent
Guillot et al.

(10) Patent No.: US 9,618,771 B2
(45) Date of Patent: Apr. 11, 2017

(54) METHOD FOR DETERMINING A PROGRESSIVE OPTHALMIC LENS AND A SET OF SEMI FINISHED LENS BLANKS

(71) Applicant: ESSILOR INTERNATIONAL (COMPAGNIE GENERALE D'OPTIQUE), Charenton le Pont (FR)

(72) Inventors: Matthieu Guillot, Charenton le Pont (FR); Carlos Rego, Charenton le pont (FR); Hélène De Rossi, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 134 days.

(21) Appl. No.: 14/365,973

(22) PCT Filed: Dec. 17, 2012

(86) PCT No.: PCT/EP2012/075772
§ 371 (c)(1),
(2) Date: Jun. 16, 2014

(87) PCT Pub. No.: WO2013/087925
PCT Pub. Date: Jun. 20, 2013

(65) Prior Publication Data
US 2014/0354944 A1    Dec. 4, 2014

(30) Foreign Application Priority Data
Dec. 15, 2011 (EP) .................................... 11306675

(51) Int. Cl.
*G02C 7/02*    (2006.01)
*G02C 7/06*    (2006.01)

(52) U.S. Cl.
CPC ............. *G02C 7/027* (2013.01); *G02C 7/028* (2013.01); *G02C 7/06* (2013.01); *G02C 7/068* (2013.01); *G02C 2202/08* (2013.01)

(58) Field of Classification Search
CPC .......... G02C 7/027; G02C 7/028; G02C 7/06; G02C 7/068; G02C 2202/08; G02C 7/041;
(Continued)

(56) References Cited

U.S. PATENT DOCUMENTS 6,318,859 B1 * 11/2001 Baudart ................. G02C 7/025
351/159.42
6,382,789 B1    5/2002 Baudart
2006/0176445 A1 * 8/2006 Shinohara ............... G02C 7/061
351/159.48

FOREIGN PATENT DOCUMENTS

EP    0578833    1/1994
EP    0 927 377    7/1999
(Continued)

OTHER PUBLICATIONS

B. Bourdoncle et al., entitled "Ray tracing through progressive ophthalmic lenses", 1990 International Lens Design Conference, D. T. Moore ed., Proc. Soc. Photo. Opt. Instrum. Eng.
(Continued)

*Primary Examiner* — Scott J Sugarman
*Assistant Examiner* — Ibrahima Diedhiou
(74) *Attorney, Agent, or Firm* — Cozen O'Connor

(57) ABSTRACT

A method for determining a progressive ophthalmic lens, comprising determining first, second and third intermediate values of regression as the strongest regression that can be applied on the front surface of the lens while keeping a mean sphere value in at least a portion of the lower part of the rear surface of the lens less or equal to, respectively, first, second and third predetermined values; and determining a value of regression (d) for the front surface as the maximum value among the first, second and third intermediate values of regression.

5 Claims, 3 Drawing Sheets

(58) Field of Classification Search
CPC ........ G02C 7/061; G02C 7/063; G02C 7/086; G02C 2202/16; G02C 7/02; G02C 7/024; G02C 7/066
USPC ............ 351/159.42, 159.74, 159.47, 159.48, 351/159.62, 159.46
See application file for complete search history.

(56) References Cited

FOREIGN PATENT DOCUMENTS

| | | |
|---|---|---|
| EP | 0 990 939 | 4/2000 |
| EP | 1688781 | 8/2006 |
| WO | WO 98/12590 | 3/1998 |
| WO | WO00/72051 | 11/2000 |
| WO | WO 2009/065965 | 5/2009 |
| WO | WO 2010/043704 | 4/2010 |
| WO | WO 2010/072749 | 7/2010 |
| WO | WO2010/093664 | 8/2010 |
| WO | WO 2010/100528 | 9/2010 |

OTHER PUBLICATIONS

S. Francois et al., entitled "Tscherning Ellipses extended to Acuity Drop, Distorsion and Chromatism using Ray Tracing", Vision science and its applications (VISA) vol. 1, OSA Technical Digest Series (Opt. Soc. of Am. Washington D.C., 1998), pp. 140-143.

\* cited by examiner

METHOD FOR DETERMINING A PROGRESSIVE OPTHALMIC LENS AND A SET OF SEMI FINISHED LENS BLANKS

RELATED APPLICATIONS

This is a U.S. National stage of International application No. PCT/EP2012/075772 filed on Dec. 17, 2012. This patent application claims the priority of European application No. 11306675.7 filed Dec. 15, 2011, the disclosure contents of which is hereby incorporated by reference.

FIELD OF THE INVENTION

The invention relates to progressive ophthalmic lenses. The invention also relates to semi-finished lens blanks having a first aspherical surface and a second unfinished surface that is intended to be further machined to form a progressive ophthalmic lens. The invention relates to methods for determining such progressive ophthalmic lenses and such a set semi-finished lens blanks.

BACKGROUND OF THE INVENTION

A wearer may be prescribed a positive or negative optical power correction. The ophthalmic prescription can include a power and/or an astigmatism prescription. For presbyopic wearers, the value of the power correction is different for far vision and near vision, due to the difficulties of accommodation in near vision. The prescription thus comprises a far-vision power value and an addition representing the power increment between far vision and near vision. The addition is qualified as prescribed addition. Ophthalmic lenses suitable for presbyopic wearers are multifocal lenses, the most suitable being progressive multifocal lenses.

The ophthalmic prescription can include an astigmatism prescription. Such a prescription is produced by the ophthalmologist in the form of a pair formed by an axis value (in degrees) and an amplitude value (in diopters). The amplitude value represents the difference between minimal and maximal power in a given direction which enables to correct the visual defect of a wearer. According to the chosen convention, the axis represents the orientation of one of two powers with relation to a reference axis and in the sense of rotation chosen. Usually, the TABO convention is used. In this convention, the reference axis is horizontal and the sense of rotation is anticlockwise for each eye, when looking to the wearer. An axis value of +45° therefore represents an axis oriented obliquely, which when looking to the wearer, extends from the quadrant located up on the right to the quadrant located down on the left. Such an astigmatism prescription is measured on the wearer looking in far vision. The term <<astigmatism>> is used to designate the pair (amplitude, angle); despite this use not being strictly correct, this term is also used to refer to the amplitude of the astigmatism. The person skilled in the art can understand from the context which meaning is to be considered. It is also known for the person skilled in the art that the prescribed power and astigmatism of a wearer are usually called sphere SPH, cylinder CYL and axis.

To obtain a progressive ophthalmic lens corresponding to a wearer prescription, a semi-finished ophthalmic lens blank can be provided by a lens manufacturer. Generally, a semi-finished ophthalmic lens blank comprises a first surface corresponding to an optical reference surface, for example a progressive surface in the case of traditional progressive addition lenses, and a second unfinished surface. A semi-finished lens blank having suitable optical characteristics is selected based on the wearer prescription and the unfinished surface is machined and polished by a prescription laboratory so as to obtain a lens complying with the prescription. The semi-finished lens blank may be produced by molding or by digital surfacing. The unfinished surface can be machined by digital surfacing.

A product line is defined as a family of lenses having common characteristics, i.e. common optical performances. For each product line, ranges of prescriptions are defined. A given range of prescriptions may include data relating to the ametropia of the wearer and/or data relating to the eye of the wearer. A set of semi-finished ophthalmic lens blanks are thus defined, each lens blank being adapted for manufacturing ophthalmic lenses within a given range of prescription. For instance, a product line having a given progressive design may be defined with 5 different base values, 12 different addition values and 2 different designs respectively for right and left eye, i.e. 120 reference surfaces to define in the set of semi-finished ophthalmic lens blanks. A prescription laboratory will refer to a selection chart to determine which semi-finished ophthalmic lens blank of the set to use for a given prescription.

WO-A-2009/065965 discloses a method for selecting a semi-finished lens blank according to a given spectacle frame.

A progressive ophthalmic lens may also be obtained by directly machining both surfaces using digital surfacing equipments. A raw lens blank is provided; a first aspheric surface is machined and a second aspheric surface is machined, the second aspheric surface being determined by calculation based on data relative to the first aspheric surface and on data relative to the wearer; such calculation may be an optical optimization. An ophthalmic lens complying with the prescription is thus obtained.

Whatever technology is used—starting from a semi-finished lens blank or machining both surfaces by digital surfacing—accurate positioning of the lens on the digital surfacing machine is required to ensure that the optical characteristics of the lens are fulfilled.

WO-A-2010/072749 discloses a method of manufacturing an ophthalmic lens by digital surfacing and identifies the issue of accurate positioning of the lens member on a blocker.

SUMMARY OF THE INVENTION

One object of the invention is to facilitate manufacturing of a progressive ophthalmic lens while keeping improved performance of the lens relative to image deformation, i.e. distortion while guaranteeing a good sharpness.

This object is achieved in accordance with one aspect of the invention directed to a method for determining a progressive ophthalmic lens having a regressive front surface, the method comprising the steps of:
  defining a front surface of the lens and a rear surface of the lens;
  defining an upper part on each surface of the lens and a lower part on each surface of the lens;
  choosing a refractive index of the lens;
  choosing a base value for the front surface of the lens;
  determining a first intermediate value of regression, said first intermediate value of regression being determined as the strongest regression that can be applied on the front surface of the lens while keeping a mean sphere value in at least a portion of the lower part of the rear surface of the lens less or equal to a first predetermined value;

determining a second intermediate value of regression, said second intermediate value of regression being determined as the strongest regression that can be applied on the front surface of the lens while keeping a mean sphere value in at least a portion of the lower part of the front surface of the lens superior or equal to a second predetermined value;

determining a third intermediate value of regression, said third intermediate value of regression being determined as the strongest regression that can be applied on the front surface of the lens while keeping an addition on the rear surface of the lens less or equal to a third predetermined value;

determining a value of regression for the front surface as the maximum value among the first, second and third intermediate values of regression, wherein said value of regression (d) is to be applied to the front surface of the lens.

Advantageously according to an embodiment of the invention, said first, second and third predetermined values (V1, V2, V3) may be selected to allow accurate machining of the rear surface of the lens.

According to embodiments, the first predetermined value is set to 2.5 diopters, more preferably to 1.5 diopters; the second predetermined value is set to −0.5 diopter, preferably to −0.25 diopter, and more preferably to zero; the third predetermined value is set to 6 diopters, more preferably to 5 diopters.

According to an embodiment, a near vision reference point is defined on the rear surface of the lens, and the mean sphere value in a circle of 15 mm diameter centered on the near vision reference point on the rear surface is less or equal to the first predetermined value.

According to an embodiment, a near vision reference point is defined on the front surface of the lens, and the mean sphere value in a circle of 12 mm diameter centered on the near vision reference point on the front surface is superior or equal to the second predetermined value (V2).

As the regression applied on the front surface of the progressive ophthalmic lens is determined according to the invention, it is thus possible to ensure an enhanced technical feasibility of the lens while providing improved optical quality of the lens.

Another object of the invention is to determine an ophthalmic lens blank that can be used for manufacturing of a progressive ophthalmic lens while keeping improved performance of the lens relative to image deformation, i.e. distortion while guaranteeing a good sharpness.

This object is achieved in accordance with an aspect of the invention directed to a method for determining a semi-finished ophthalmic lens blank having a refractive index, a defined aspheric regressive front surface and an unfinished rear surface intended to be machined to form a progressive ophthalmic lens having a far vision zone and a near vision zone, the method comprising the steps of:

(i) determining a range of prescription data, a plurality of ophthalmic lenses within said range of prescription being adapted to be machined from said blank;

(ii) for each of at least two lenses of said plurality of ophthalmic lenses, determining a value of regression for the front surface according to the method of the invention;

(iii) determining a maximum regression value for the front surface of the blank as the maximum value among the values of regression determined in step (ii).

The invention also aims to determining a set of ophthalmic lens blanks. This object is achieved with a method for determining a set of semi-finished ophthalmic lens blanks, the method comprising the steps of:

determining a set of prescription data ranges, each prescription range being associated with one semi-finished lens of the set;

determining each semi-finished lens blank according to the invention.

Another aspect of the invention relates to a set of ophthalmic semi-finished lens blanks, each lens blank having a defined aspheric regressive front surface and an unfinished rear surface adapted to be machined to form a progressive ophthalmic lens, a given lens blank of the set being suitable to form a plurality of progressive ophthalmic lenses having different values of prescribed addition.

According to an embodiment, the regression value on the front surface is comprised between −0.25 diopter and −5.25 diopters, more preferably between −0.25 diopter and −2.5 diopters.

Another aspect of the invention relates to a computer program product comprising one or more stored sequence of instruction that is accessible to a processor and which, when executed by the processor, causes the processor to carry out the steps of the method according to the invention. Another aspect of the invention concerns a computer readable medium carrying out one or more sequences of instructions of the computer program product of the invention.

Another aspect of the invention relates to a set of data comprising data relating to a set of lens blanks determined according to the method of the invention. According to an embodiment, the set of data has a three dimensional representation, a first dimension being dedicated to prescribed addition, a second dimension being dedicated to prescribed sphere and a third dimension being dedicated to prescribed cylinder, a given pair of values (bn, dn) of base and regression for the front surface of a given blank being represented along the three dimensions. Said set of data can be provided in a kit of parts in combination with a set of lens blanks determined according to the method of the invention.

Further features and advantages of the invention will appear from the following description of embodiments of the invention, given as non-limiting examples, with reference to the accompanying drawings listed hereunder.

It can be appreciated that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF PREFERRED EMBODIMENTS

A progressive lens comprises two non-rotationally symmetrical aspheric surfaces, for instance but not limited to, progressive surface, regressive surface, toric or atoric surfaces.

As is known, each point of an aspherical surface has an altitude z. For each point of the surface, a minimum curvature $CURV_{min}$ is given by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspherical surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical.

From these expressions of the minimum and maximum curvatures $CURV_{min}$ and $CURV_{max}$, the minimum and maximum spheres labelled $SPH_{min}$ and $SPH_{max}$ can be deduced according to the kind of surface considered.

When the surface considered is the object side surface—also called front surface, the expressions are the following:

$$SPH_{min} = (n-1) * CURV_{min} = \frac{n-1}{R_{max}} \text{ and}$$

$$SPH_{max} = (n-1) * CURV_{max} = \frac{n-1}{R_{min}}$$

where n is the index of the constituent material of the lens.

If the surface considered is an eyeball side surface—also called rear surface, the expressions are the following:

$$SPH_{min} = (1-n) * CURV_{min} = \frac{1-n}{R_{max}} \text{ and}$$

$$SPH_{max} = (1-n) * CURV_{max} = \frac{1-n}{R_{min}}$$

where n is the index of the constituent material of the lens.

As is known, a mean sphere $SPH_{mean}$ at any point on an aspherical surface can also be defined by the formula:

$$SPH_{mean} = \frac{1}{2}(SPH_{min} + SPH_{max})$$

A cylinder CYL is also defined by the formula $CYL = SPH_{max} - SPH_{min}$.

The characteristics of any complex face of the lens may be expressed by means of the local mean spheres and cylinders. A surface can be considered as locally aspherical when the cylinder is at least 0.25 diopters.

Figure 1:
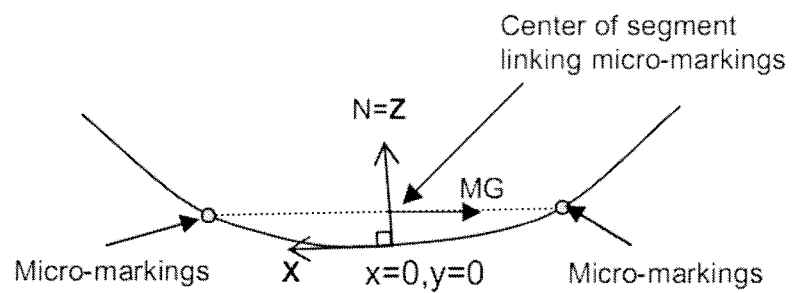
FIGS. 1 and 2 show referential defined with respect to micro-markings, for a surface bearing micro-markings and for a surface not bearing the micro-markings respectively.
Figure 2:
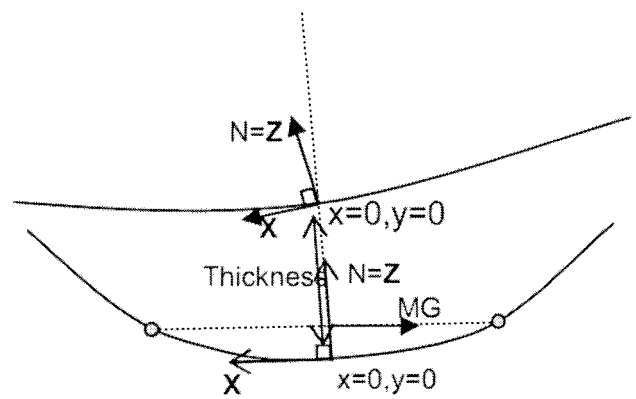

Whenever a lens is characterized by reference to one of its aspherical surfaces, a referential is defined with respect to micro-markings as illustrated in FIGS. 1 and 2, for a surface bearing micro-markings and for a surface not bearing the micro-markings respectively.

Progressive lenses comprise micro-markings that have been made mandatory by a harmonized standard ISO 8990-2. Temporary markings may also be applied on the surface of the lens, indicating positions of control points on the lens, such as a control point for far vision, a control point for near vision, a prism reference point and a fitting cross for instance. If the temporary markings are absents or have been erased, it is always possible to a skilled person to position the control points on the lens by using data provided by the manufacturer, such as a mounting chart for instance, and the permanent micro-markings. The lens manufacturer has to guarantee prescription at the control points.

The micro-markings also make it possible to define referential for both surfaces of the lens.

FIG. 1 shows the referential for the surface bearing the micro-markings. A central reference point is defined as the point of the surface at which the normal N to the surface intersects the center of the segment linking the two micro-markings. Said central reference point is considered as the center of the surface (x=0, y=0). MG is the collinear unitary vector defined by the two micro-markings. Vector Z of the referential is equal to the unitary normal (Z=N) and it is oriented towards the eye of the wearer; vector Y of the referential is equal to the vector product of MG by Z; vector X of the referential is equal to the vector product of Y by Z. {X, Y, Z} thereby form a direct orthonormal trihedral. The center of the referential is the center of the surface x=0 mm, y=0 mm. The X axis is the horizontal axis and the Y axis is the vertical axis. The radius of curvature for this surface is expressed in this direct orthonormal trihedral.

FIG. 2 shows the referential for the surface opposite to the surface bearing the micro-markings. Similarly, a central reference point may be defined as the point at which the normal N intersecting the center of the segment linking the two micro-markings on the first surface intersects the second surface. Said central reference point is considered as the center of the surface (x=0, y=0). Referential of the second surface is constructed the same way as the referential of the first surface, i.e. vector Z is equal to the unitary normal of the second surface and it is oriented towards the eye of the wearer; vector Y is equal to the vector product of MG by Z; vector X is equal to the vector product of Y by Z. As for the first surface, the X axis is the horizontal axis and the Y axis. The center of the referential of the surface is also x=0 mm, y=0 mm. The radius of curvature for this surface is also expressed in this direct orthonormal trihedral.

Similarly, on a semi-finished lens blank, standard ISO 10322-2 requires micro-markings to be applied. The center of the aspherical surface of a semi-finished lens blank can therefore be determined as well as a referential as described above.

A surface is considered as locally concave when the mean sphere $SPH_{mean}$ is inferior to zero, and a surface is considered as locally convex when the mean sphere $SPH_{mean}$ is superior to zero.

Moreover, a progressive multifocal lens may also be defined by optical characteristics, taking into consideration the situation of the person wearing the lenses. Reference can be made to EP-A-0 927 377, EP-A-0 990 939 or WO-A-2010/100528 for instance defining a lens with optical characteristics.

As known per se, it is possible to define a wearer optical power and astigmatism, in each viewing direction.

Possible definitions of the optical power and the astigmatism of the lens, in the wearing conditions, can be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng. Wearing conditions may be calculated from a ray-tracing program, for a given lens. Further, the optical power and the astigmatism may be calculated so that the prescription is fulfilled for a wearer wearing his spectacles in the wearing conditions. Optical power and astigmatism can also be measured by a frontofocometer.

The values in optic terms can be expressed for gaze directions. Gaze directions are usually given by their degree of lowering and azimuth in a frame whose origin is the center of rotation of the eye. When the lens is mounted in front of the eye, a reference point called the fitting cross—which can be confounded with or distinct from the central reference point of one of the surfaces as defined above—is placed before the pupil or before the eye rotation center of the eye for a primary gaze direction. The primary gaze direction corresponds to the situation where a wearer is looking straight ahead. In the chosen frame, the central reference point corresponds thus to a lowering angle α of 0° and an azimuth angle β of 0° whatever surface of the lens the fitting cross is positioned—rear surface or front surface.

In the remainder of the description, terms like <<up>>, <<bottom>>, <<horizontal>>, <<vertical>>, <<above>>, <<below>>, or other words indicating relative position may be used. These terms are to be understood in the wearing conditions of the lens. Notably, the "upper" part of the lens corresponds to a negative lowering angle α<0° and the "lower" part of the lens corresponds to a positive lowering angle α>0°. Similarly, the "upper" part of the surface of a lens—or of a semi-finished lens blank—corresponds to a positive value along the y axis, and preferably to a value along the y axis superior to the y_value at the central reference point and the "lower" part of the surface of a lens—or of a semi-finished lens blank—corresponds to a negative value along the y axis in the frame as defined above with respect to FIGS. 1 and 2, and preferably to a value along the y axis inferior to the y_value at the central reference point.

Figure 3:
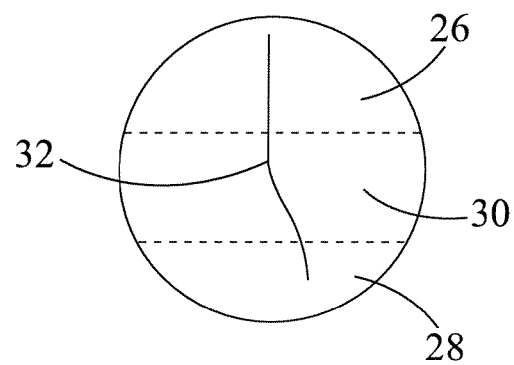
FIG. 3 is a schematic illustration of a multifocal progressive lens.

The visual field zones seen through a progressive lens are schematically illustrated in FIG. 3. The lens comprises a far vision zone 26 located in the upper part of the lens, a near vision zone 28 located in the lower part of the lens and an intermediate zone 30 situated in the lower part of the lens between the far vision zone 26 and the near vision zone 28. The lens also has a main meridian 32 passing through the three zones and defining a nasal side and a temporal side. Typically, the far vision zone 26 includes a far vision reference point FV and the near vision zone 28 includes a near vision reference point NV. When a surface of the lens is considered, the far vision zone and the near vision zone can be defined as the projection of the above defined zones on the surface. When the surface of a lens or of a semi-finished lens blank is considered, the far vision zone, respectively the near vision zone, can be defined as the zones that contribute to the far vision field zone, respectively the near vision field zone, when the lens is used.

The far vision reference point (resp. the near vision reference point) can be, for example, a control point used by the optician to verify prescription data once the lens is fitted into a frame. More generally, the far vision reference point (resp. the near vision reference point) can be any other point of the front surface in the far vision zone (resp. in the near vision zone).

In the description that follows, the near vision reference point NV will be defined as a point of the front surface of the lens (resp. on the rear surface of the lens) chosen by the lens manufacturer and situated at a distance comprised between 8 mm and 14 mm below the central reference point and offset by 0 mm to 7 mm towards the nose along the x-axis in the referential of the front surface (resp. of the rear surface) defined above; and the far vision reference point FV will be defined as the point of the front surface of the lens chosen by the lens manufacturer and situated at a distance comprised between 0.0 mm and 12 mm above the central reference point in the referential of the front surface defined above.

The invention relies on a study by the applicant of the impact of the geometry of the lens on visual performances. Notably, the applicant has established that a regressive front surface improves space perception in peripheral vision when a wearer is looking through the final lens. The applicant has observed that the more regressive the front surface was, the better the optical distortion was compensated hence improving space perception.

By "regressive surface" is meant a continuous aspheric surface having a far vision zone, a near vision zone and a zone of decreasing mean sphere value connecting the far vision and near vision zones. By "progressive surface" is meant a continuous aspheric surface having a far vision zone, a near vision zone and a zone of increasing mean sphere value connecting the far vision and near vision zones.

The "addition of a surface" may be defined as the mean sphere variation between the near vision reference point (NV) belonging to the near vision zone and the far vision reference point (FV) belonging to the far vision zone. Reference points can be for instance, but not limited to, control points. The addition of the surface can be expressed as:

$$\text{Add}_{surface} = SPH_{mean}(NV) - SPH_{mean}(FV);$$

If $\text{Add}_{surface} > 0$, the surface is a progressive surface;
If $\text{Add}_{surface} < 0$, the surface is a regressive surface. Thus, reference will be made hereafter to "regression values" as being negative values expressed in dioptrie.

When the far vision reference point and the near vision reference point are selected in the far and the near vision zones such that the absolute value of the addition of the surface is maximized, this addition value will be called the maximum addition value of the surface.

However, when the front surface is regressive, i.e. mean sphere value in at least a portion of the far vision zone is more than the mean sphere value in at least a portion of the near vision zone, the rear surface must have an even stronger addition to obtain a positive power addition on the final lens. For a progressive lens suitable for a prescription of 2 diopters of prescribed addition, should the front surface have a negative addition of about 3 diopters for instance, the rear surface should have a positive addition of about 5 diopters to ensure a positive power addition of about 2 diopters on the lens. Such a strong sphere variation on the rear surface will also induce a strong cylinder variation. Strong variations of sphere and cylinder increase complexity when machining the surface.

Indeed, when machining a surface of the lens, a grinding step is first performed wherein material is taken away from the surface of the lens to bring the surface as close as possible to the geometry requested to obtain the surface characteristics sought. Then a polishing step is performed to obtain a transparent surface while preserving the geometry obtained after grinding.

During the grinding step, gradients of sphere and cylinder will impact the acceleration of the machining tool. The stronger the gradients are, the steeper the acceleration is, which can lead to degradation of the surface obtained after grinding and hence to optical performances degradations.

During the polishing step, the gradients tend to be filtered. Whenever gradients values vary sharply, the polishing step will soften this variation, which can lead to degradation of the surface obtained after polishing, notably along the meridian line.

Moreover, high gradients of sphere and cylinder and strong variations of gradients render the surfaces very sensitive to positioning with respect to one another. Positioning errors between both surfaces are caused by manufacturing process, for instance when the lens blank is positioned on a blocker of a digital surfacing machine to create the second surface from the unfinished surface.

The regression of the front surface must therefore be kept to a limited value to limit the addition that must be applied to the rear surface and allow accurate machining of such rear surface.

Moreover, it was observed that a strong regression over the front surface may introduce a local concavity of the front surface in the near vision zone. The front surface is globally convex, i.e. the average value of mean spheres over the surface is superior or equal to zero. However, when the mean sphere value in the far vision zone is low, if the regression is too strong on the surface, a local concavity will appear in the near vision zone. Such a local concavity is detrimental to the lens' esthetic when fitted in a frame. Such a local concavity also increases complexity of the mold should the lens be manufactured from a molded lens blank.

Furthermore, it was observed that a strong regression over the front surface may introduce a local convexity of the rear surface in the near vision zone. The rear surface is globally concave, i.e. the average value of mean spheres over the surface is inferior to zero. However, when the regression of the front surface is too strong, a local convexity will appear over the rear surface in the near vision zone. Such a local convexity is detrimental to the lens' esthetic when fitted in a frame. Such a local convexity also increases complexity of varnish application over the rear surface of the lens.

Thus, the invention proposes a method for determining a progressive ophthalmic lens having a front regressive surface that rules out the above mentioned problems. The invention proposes to determine the maximum regression that can be applied to the front surface of the lens, in order to improve optical distortion, while ensuring manufacturing feasibility and esthetic of the lens.

The progressive lens of the invention may be manufactured by direct surfacing of both surfaces. In this case, a unique lens may be determined for a specific wearer. The regression applied to the front surface of the lens can be maximized while ensuring that the rear surface can be accurately manufactured and the final lens esthetical to wear.

Figure 4:
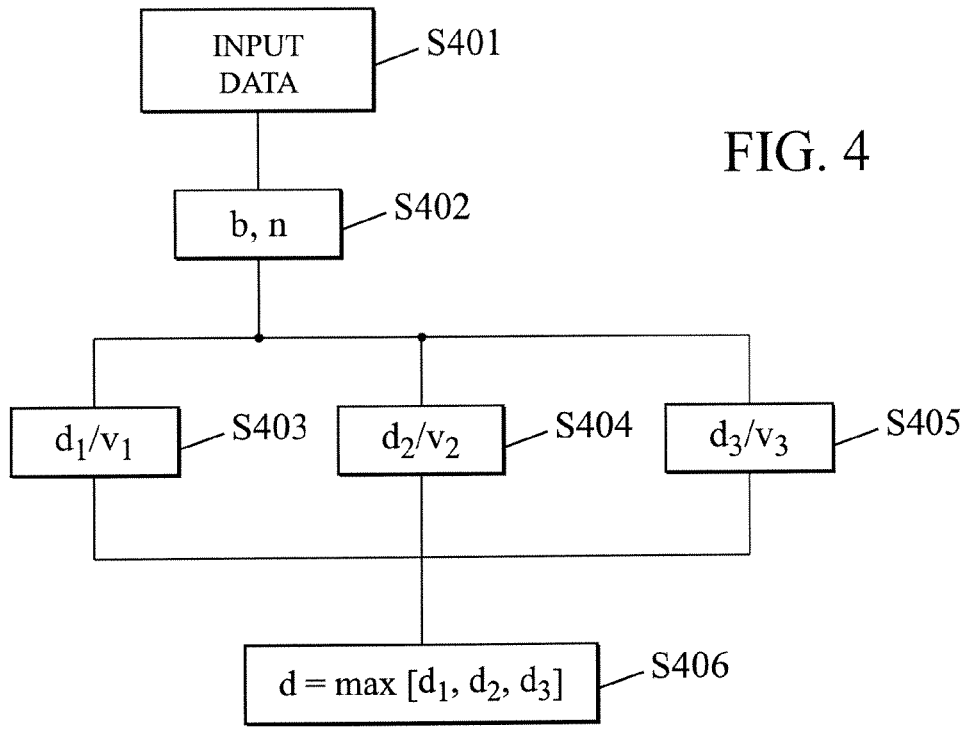
FIG. 4 is a flowchart of the method for determining a progressive ophthalmic lens according to an embodiment of the invention.

FIG. 4 is a flowchart of the method for determining a progressive ophthalmic lens according to the invention.

At step S401, input data are determined, including data relating to the wearer and/or data relating to the frame chosen by the wearer and/or data relating to optical performances. The data relating to the wearer comprise at least a prescription of addition and any other relevant prescription data such as sphere, cylinder and/or data relative to the eye of the wearer. The optical performances are a set of optical characteristics of a lens defined for given gaze directions when placed in front of the wearer's eye.

At step S402, a base value is chosen for the front surface of the lens and a refractive index value is chosen for the lens. The base value is defined as the mean sphere value at the far vision reference point. The base value is chosen based on the input data. For instance, the base value can be chosen from prescription data and/or to optical performances, as disclosed in the article by S. FRANCOIS et al., entitled *Tscherning Ellipses extended to Acuity Drop, Distorsion and Chromatism using Ray Tracing*, Vision science and its applications (VISA) Vol. 1, OSA Technical Digest Series (Opt. Soc. of Am. Washington D.C., 1998), pp 140-143; or the base value can be chosen from data relating to the frame chosen by the wearer, as disclosed in WO-A-2009/065965. Of course, the base value can also be chosen from a combination of the above mentioned data. The choice of the refractive index value depends on the material selected to manufacture the lens and will impact the optical power value through the lens and hence the addition of the rear surface to compensate for the regression of the front surface in order to match the prescribed addition.

At steps S403 to S405, intermediate values of regression are determined to take into account the several constraints identified above, i.e. local convexity of the rear surface in the near vision zone, local concavity of the front surface in the near vision zone and maximum addition on the rear surface.

More specifically, at step S403, a first intermediate value d1 is determined as the strongest regression that can be applied on the front surface of the lens while keeping a mean sphere value in at least a portion of the lower part of the rear surface of the lens less or equal to a first predetermined value V1. This first intermediate value d1 makes sure that the local convexity of the rear surface in the near vision zone is kept at a reasonable value to ensure technical feasibility and esthetic. This first criterion can be appreciated over the entire rear surface and is appreciated at least over the lower part of the rear surface, i.e. for negative y values in the reference frame defined above with respect to FIGS. 1 and 2. Indeed, the regression applied to the front surface will mostly impact the lower part of the lens. This first criterion is more preferably appreciated at least over a relevant portion of the lower part of the rear surface which can be delimited by a circle of 15 mm of diameter centered on the near vision reference point of the rear surface, where local convexity is most at risk to be introduced on the rear surface. The first predetermined value V1 is set to 2.5 diopters, preferably 1.5 diopters. The predetermined value V1 of 2.5 diopters is relevant to consider the extreme of the product line gathering high power prescription lenses of the range and the predetermined value V1 of 1.5 diopters is relevant to consider the center of the product line gathering the center of the range in term of prescription.

At step S404, a second intermediate value of regression d2 is determined as the strongest regression that can be applied on the front surface of the lens while keeping a mean sphere value in at least a portion of the lower part of the front surface of the lens superior or equal to a second predetermined value V2. This second intermediate value d2 makes sure that the local concavity of the front surface in the near vision zone is kept at a reasonable value to ensure technical feasibility and esthetic. This second criterion can be appreciated over the entire front surface and is appreciated at least over the lower part of the front surface, i.e. for negative y values in the reference frame defined above with respect to FIGS. 1 and 2. Indeed, the regression applied to the front surface will mostly impact the lower part of the lens. This second criterion is more preferably appreciated at least over a relevant portion of the lower part of the front surface which can be delimited by a circle of 12 mm of diameter centered on the near vision reference point of the front surface, where local concavity is most at risk to be introduced on the front surface. The second predetermined value V2 is set to −0.5 diopter, preferably to −0.25 diopter and more preferably to zero which means that no concavity is accepted on the considered portion of the front surface. For instance, the mean sphere value in the entire front surface is set superior or equal to −0.5 diopter and the mean sphere value in the 12 mm circle surrounding the near vision reference point of the front surface is set superior or equal to zero which means that no concavity is accepted at and around the near vision reference point.

At step S405, a third intermediate value of regression d3 is determined as the strongest regression that can be applied on the front surface of the lens while keeping an addition on the rear surface of the lens less or equal to a third predetermined value V3. This third intermediate value d3 makes sure that the addition on the rear surface is kept at a reasonable value to ensure technical feasibility. The third predetermined value V3 is set to 6 diopters and more preferably to 5 diopters. The predetermined value V3 of 6 diopters is relevant when the value of the addition is considered over the entire rear surface (maximized value of addition of the surface). The predetermined value V3 of 5 diopters is relevant when the value of the addition is considered between the reference control points (mean sphere variation between the near vision reference point NV and the far vision reference point FV as defined above).

At step S406, a value of regression d is determined for the front surface as the maximum value among the first, second and third intermediate values of regression d=max [d1, d2, d3]. It should be noted that d1, d2 and d3 are values of regression and are therefore negative values; thus, the maximum value is the minimum in absolute value d=−min [|d1|, |d2|, |d3|].

The method of the invention makes it possible to determine the strongest regression that can be applied to the front surface of the lens to provide optimal comfort of the wearer relative to distortion, while ensuring that the lens can be accurately manufactured, mounted into the frame and remain esthetical to wear.

The method further comprises a step of calculating the rear surface of the lens to meet the input data relative to the wearer and/or to the frame and/or to the optical performances; reference can be made to WO-A-2010/043704 for calculating by optimization the ophthalmic lens according to at least one criterion.

The progressive lens of the invention may be manufactured from a semi-finished lens blank. In this case, a set of semi-finished lens should be determined for a set of prescription ranges. The regression applied to the front surface of each semi-finished lens blank is maximized for a given prescription range to ensure that the rear surface can be accurately manufactured and the final lens esthetical to wear.

Figure 5:
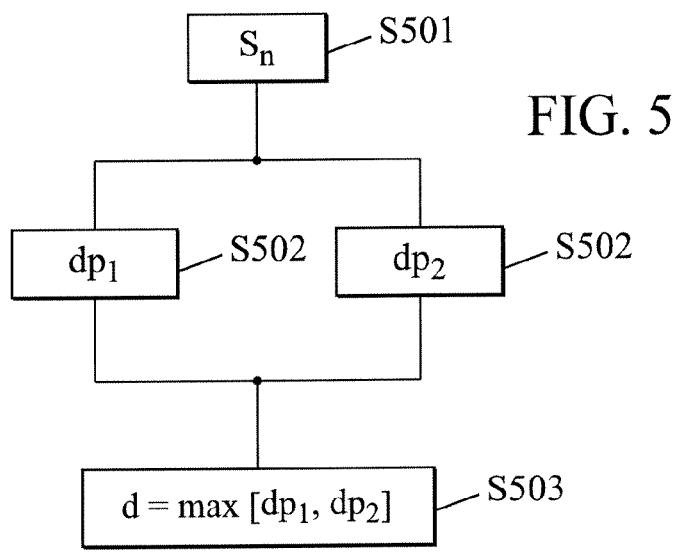
FIG. 5 is a flowchart of the method for determining a set of progressive ophthalmic lens blanks according to an embodiment of the invention.

FIG. 5 is a flowchart of the method for determining a set of semi-finished ophthalmic lens blanks according to an embodiment of the invention.

At step S501, a set of prescription data ranges S1, S2, . . . Sn are determined. Each prescription range Sn corresponds to prescription data for manufacturing a plurality of progressive ophthalmic lenses for different wearers having a prescription belonging to the range Sn.

At step S502, for at least two different lenses having two different prescriptions P1, P2 belonging to the prescription range Sn, values of regression $d_{P1}$, $d_{P2}$ are calculated according to the method described with reference to FIG. 4. For instance, a first value of regression $d_{P1}$ can be determined following the method of FIG. 4 for a lens having prescription data P1 corresponding to a first prescribed sphere and addition of the considered prescription range Sn and a second value of regression $d_{P2}$ can be determined following the method of FIG. 4 for a lens having prescription data P2 corresponding to a second prescribed sphere and addition of the considered prescription range Sn.

At step S503, the value of regression d to apply to the front surface of the lens blank allocated to the considered prescription range Sn is determined as the maximum value among the values of regression $d_{P1}$, $d_{P2}$ determined in step S502. It should be noted that more than two values $d_{P1}$, $d_{P2}$ can be determined in step S502 and that said values of regression are negative values.

The method of the invention makes it possible to determine the strongest regression that can be applied to the front surface of a semi-finished lens blank to provide optimal comfort of the wearer relative to distortion, while ensuring that the semi-finished lens blank can be accurately manufactured into an esthetical final lens within a given prescription range. The method further comprises a step of calculating the rear surface to meet the input data relative to the wearer and/or to the frame and/or to the optical performances; reference can be made to WO-A-2010/043704 for calculating by optimization the ophthalmic lens according to at least one criterion.

A set of ophthalmic semi-finished lens blanks is thereby defined. Each lens blank of the set has a defined aspheric regressive front surface and an unfinished rear surface adapted to be machined to form a progressive ophthalmic lens. A given lens blank of the set is suitable to form a plurality of progressive ophthalmic lenses having different values of prescribed addition with reduced distortion. The regression value on the front surface can be comprised between −0.25 diopters and −5.25 diopters, preferably between −0.25 diopters and −2.5 diopters. The value of −5.25 diopters is defined to provide a lens having 0.75 diopter of prescribed addition with an addition value of 6 diopters on the rear surface (limit value of V3 defined above). The cut-out of the semi-finished lens set depends on the number of semi-finished lens blanks included in the set, which mostly depends on economical considerations. The value of −2.5 diopters is defined when the lens blanks set is limited to two blanks per base value for economical considerations. When the number of lens blanks in the set can be increased, strongest regression values can be accepted on each lens blank.

Figure 6:
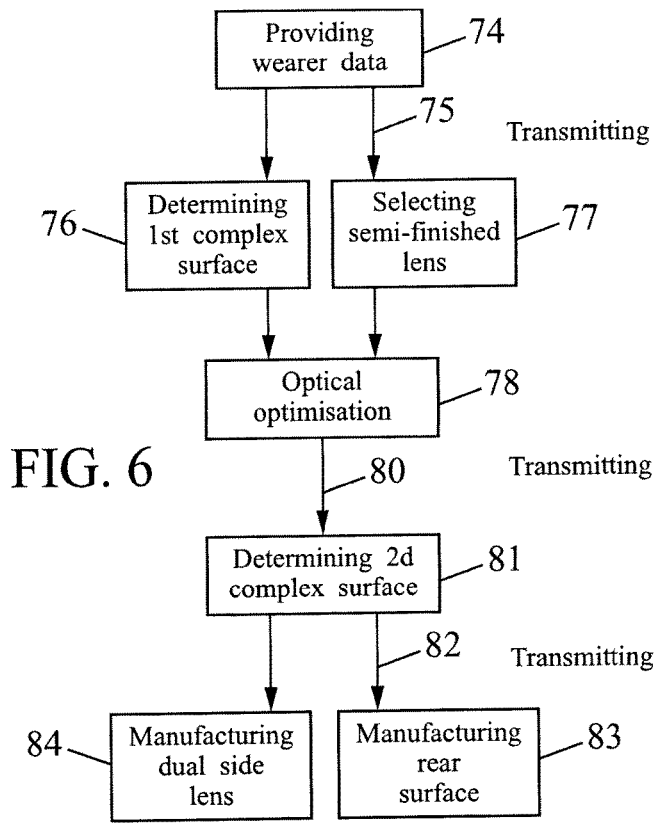
FIG. 6 is a flowchart of the steps of a method of manufacturing a lens according to an embodiment of the invention.

FIG. 6 is a flowchart of an example of the steps that can be carried out for manufacturing a progressive ophthalmic lens according to the invention.

Data relative to a wearer are provided (step 74). This can be done at a first location, i.e. a spectacle seller (optician). The data are transmitted (step 75) from the first location to a second location where a first surface is determined (step 76). This can be done in a laboratory of a lens designer. The first surface is determined using the criteria defined previously, and notably, the strongest regression that can be applied to the front surface. The data relative to the first surface are transmitted and an optical optimization of the lens based on the data relative to the wearer and on data relative to the first surface is carried out (step 78). This can be done in the same laboratory as the determination of the first surface, or in a different laboratory. The results of the optical optimization are transmitted (step 80) and a second surface of the lens is determined (step 81) according to the result of the optical optimization to meet the prescription data. This can still be done in the same laboratory, or in a different laboratory. The data relative to the first and second surface are transmitted (step 82) to a lens manufacturer and the lens is produced by double side digital surfacing (step 84) or by molding.

The progressive lens of the invention can also be manufactured using a semi-finished lens blank by selecting one of the lens blanks of the set determined according to the methods of the invention. The semi-finished lens blanks of the invention may be manufactured by digital surfacing or moulding.

Referring back to FIG. 6, data relative to a wearer are provided (step 74). The data are transmitted (step 75) from the first location to a second location where a semi-finished lens blank is selected (step 77) and where an optical optimization of the lens based on the data relative to the wearer and on data relative to the first regressive surface of the semi-finished lens blank is carried out (step 78). This can be done in a laboratory of a lens designer. The semi-finished lens blank can be selected based on the wearer data, for instance the prescribed addition, the prescribed sphere and the prescribed cylinder. The result of the optical optimization are transmitted (step 80) and a second surface of the lens is determined (step 81) according to the result of the optical optimization. This can be done in the same laboratory, or in a different laboratory. The data relative to the second surface are transmitted (step 82) to a lens manufacturer. Using the selected lens blank, the lens manufacturer surfaces the unfinished surface of the blank according to the determined second surface (step 83). The rear surface of the blank can be made by digital surfacing.

The methods of determining a lens and of determining a set of lens blanks can be implemented on a computer. Computer program products can be provided comprising one or more stored sequence of instruction that is accessible to a processor and which, when executed by the processor, causes the processor to carry out the steps of the methods are also proposed.

Such computer programs may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EE-PROMs), magnetic or optical cards, or any other type of media suitable for storing electronic instructions, and capable of being coupled to a computer system bus. A computer-readable medium carrying one or more sequences of instructions of the computer program product is thus proposed. This enables to carry out the method in any location.

A set of apparatuses for manufacturing a progressive ophthalmic lens, wherein the apparatuses are adapted to carry out the method for manufacturing is also proposed.

Figure 7:
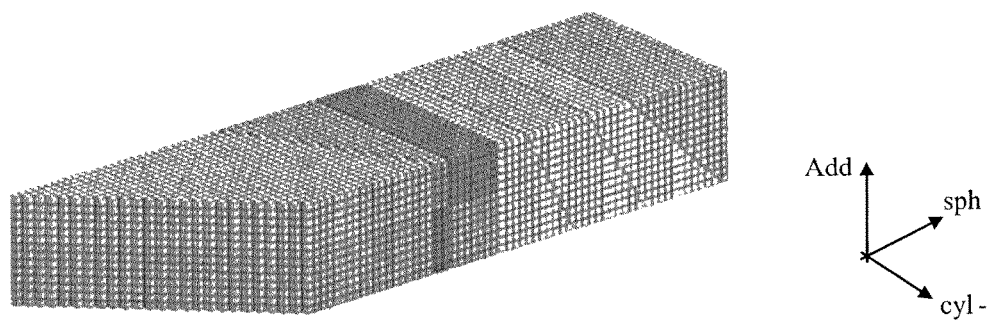
FIG. 7 is an illustration of a chart representation of a set of progressive ophthalmic lens blanks determined according to an embodiment of the invention.

The set of ophthalmic semi-finished lens blanks according to the invention can be identified within a set of data provided to lens manufacturers. Such a set of data can advantageously be in the form of a selection chart. For example, the data can be represented by a base and regression (b,d) selection chart having a three dimensional representation with a first dimension being dedicated to prescribed addition, a second dimension being dedicated to prescribed sphere and a third dimension being dedicated to prescribed cylinder. A given pair of base and regression values (bn, dn) for the front surface of a given blank may be represented along the three dimensions as illustrated in FIG. 7.

The invention claimed is:

1. A computer implemented method for manufacturing a progressive ophthalmic lens from a semi-finished lens blank having a regressive front surface exhibiting a final regression and an unfinished rear surface, the manufacturing method comprising the steps of:

defining an upper part on each surface of the lens and a lower part on each surface of the lens;

choosing a refractive index of the lens;

choosing a base value for the front surface of the lens;

determining in a determining step a value of regression (d) to be applied to the whole front surface so that said final regression is less than or equal to said value of regression (d), which is the maximum value among first, second and third intermediate values of regression (d=max [d1, d2, d3]), wherein the determining step comprises the sub-steps of:

determining said first intermediate value of regression (d1) as the strongest regression to be applied on the front surface of the lens while keeping a mean sphere value, in at least a portion of the lower part of the rear surface of the lens defined by a circle of 15 mm diameter centered on a near vision reference point on the rear surface, which is less than or equal to a first predetermined value (V1) set to 2.5 diopters or to 1.5 diopters;

determining said second intermediate value of regression (d2) as the strongest regression to be applied on the front surface of the lens while keeping a mean sphere value, in at least a portion of the lower part of the front surface of the lens defined by a circle of 12 mm diameter centered on a near vision reference point on the front surface, which is greater than or equal to a second predetermined value (V2) set to −0.5 diopter, to −0.25 diopter, or to zero;

determining said third intermediate value of regression (d3) as the strongest regression to be applied on the front surface of the lens while keeping an addition on the whole rear surface of the lens less than or equal to a third predetermined value (V3) set to 6 diopters or to 5 diopters;

calculating the rear surface of the lens to meet input data relative to a wearer of the lens based on said value of regression (d) determined in said determining step to obtain a calculated rear surface; and machining the rear surface of the lens according to said calculated rear surface, wherein said first, second and third predetermined values (V1, V2, V3) optimize the machining thereof.

2. The computer implemented method for manufacturing a progressive ophthalmic lens of claim 1, further comprising the steps of:

(i) determining a range of prescription data, a plurality of ophthalmic lenses within said range of prescription data being adapted to be machined from said lens blank;

(ii) for each of at least two lenses of said plurality of ophthalmic lenses, implementing said determining step for determining said value of regression (d) for the whole front surface of the lens blank; and (iii) determining a maximum regression value for the front surface of the lens blank as being the maximum value chosen among the respective values of regression (d) determined in step (ii) for said at least two lenses, said final regression being less than or equal to said maximum regression value.

3. A method for manufacturing a progressive ophthalmic lens comprising:

determining a set of semi-finished ophthalmic lens blanks;

determining a set of prescription data ranges (S1, S2, S3, . . . Sn), each prescription range being associated with one semi-finished lens of the set; and determining each semi-finished lens blank according to steps (i), (ii) and (iii) of claim 2.

4. A non-transitory computer program product comprising one or more stored sequences of instructions that is accessible to a processor and which, when executed by the processor, causes the processor to carry out the steps of claim 1.

5. A non-transitory computer readable medium carrying out one or more sequences of instructions of the computer program product of claim 4.

* * * * *